United States Patent [19]

Osanai

[11] 4,139,167
[45] Feb. 13, 1979

[54] CASSETTE TAPE RECORDER

[75] Inventor: Akira Osanai, Hachioji, Japan

[73] Assignee: Olympus Optical Co., Ltd., Tokyo, Japan

[21] Appl. No.: 795,065

[22] Filed: May 5, 1977

[30] Foreign Application Priority Data

May 11, 1976 [JP] Japan .............................. 51-59249[U]

[51] Int. Cl.² ...................... G11B 15/22; G11B 15/30
[52] U.S. Cl. .................................. 242/189; 242/201; 242/209
[58] Field of Search .............. 242/189, 190, 191, 201, 242/67.4, 204, 206, 209, 208, 210, 54.1, 57

[56] References Cited

U.S. PATENT DOCUMENTS

| | | | |
|---|---|---|---|
| 2,275,498 | 3/1942 | Berndt | 242/201 |
| 3,137,454 | 6/1964 | Atsumi | 242/190 |
| 3,572,606 | 3/1971 | Yamamoto | 242/190 |
| 3,854,670 | 12/1974 | Bertolazzi | 242/67.4 |
| 3,946,436 | 3/1976 | Takashino | 242/191 |
| 4,034,619 | 7/1977 | Seregni | 242/67.4 |
| 4,046,334 | 9/1977 | Kato et al. | 242/201 |

Primary Examiner—George F. Mautz
Attorney, Agent, or Firm—Lerner, David, Littenberg & Samuel

[57] ABSTRACT

A cassette tape recorder is provided in which "auto shut-off" is achieved at a terminal end of a running tape during the rewind mode when the tape comes to a stop. A tape rewind shaft is moved by a rotating drive applied thereto to cause a rocking motion of a tape end detecting lever, whereby an abutment lever is moved into the path of rotation of a release pin on a flywheel. The pin rocks the abutment lever to unlock a tape rewind member which has been maintained in its tape rewind position, thus returning it to its initial position. Systems for transmitting a rotating drive to a tape take-up shaft and to the tape rewind shaft each comprise a gear train. During a tape rewind mode, a drive switching gear in the train is operated by a switching lever to be disconnected from the transmission system associated with the tape take-up shaft and to be connected with the transmission system for the tape rewind shaft.

11 Claims, 17 Drawing Figures

CASSETTE TAPE RECORDER

BACKGROUND OF THE INVENTION

The invention relates to an "auto shut-off" apparatus for a cassette tape recorder, and more particularly, to such apparatus in which the detection of a tape end being reached during a tape rewind mode unlocks a tape rewind member of the tape recorder to thereby deactuate the recorder operation automatically and to return the tape rewind member to its initial position.

A variety of "auto shut-off" apparatus are proposed and known for a cassette tape recorder for the purpose of automatically interrupting the recorder operation and for returning various operating members to their initial positions in response to the detection of a terminal end of a running tape being reached during a record or a playback mode of the tape recorder. Specifically, a conductive foil may be applied to a terminal end of a magnetic tape so as to be electrically detected to activate a stopping device. Alternatively, a terminal end of the tape may be formed with a portion of different optical reflectivity and transmittance from those of a magnetic surface, so that such portion may be optically detected to activate a stopping device. As a further alternative, a tape tension sensor applied to a guide roller for the magnetic tape may be utilized to mechanically detect a change in the tension as a tape end is reached, thereby activating a stopping device.

However, with a tape cassette, the containment of a magnetic tape within a cassette makes it very difficult and expensive to apply a suitable detectable portion to or otherwise machine the tape end. In this respect, the use of stop means which is commonly referred to as a "mechanical stop" utilizing the tape tension will be more advantageous. Since a cassette tape has its one end secured to one of the tape hubs and its other end secured to the other tape hub, the rotation of the tape hubs will be interrupted when a tape end is reached on the supply hub. As a consequence, a tape drive shaft which engages the supply hub will slip relative to the hub, experiencing an increased load. This can be detected to activate a mechanical stop.

However, a mechanical stop which accurately detects a change in the load on the tape drive shaft is very complex and occupies an increased amount of space within the recorder. While such a mechanical stop may be assembled into a tape recorder which is adapted to use a tape cassette of a size commonly referred to as a compact cassette, it cannot be incorporated into a tape recorder of a miniature size which can be received into the pocket of a suit or shirt and which is adapted for use with a micro-cassette. Thus it will be seen that a miniature tape recorder using a micro-cassette cannot utilize the mechanism which detects a change in the load on the tape drive shaft due to the limited space available.

In both the micro-cassette and compact cassette, the tape hubs on which the magnetic tape is received is mounted with respect to the cassette body so that they are slightly movable or capable of "rattling" with respect to the cassette body in order to facilitate the fitting of the tape hubs onto the associated shafts. In consideration of this fact, a tape supply shaft which engages one of the tape hubs may be disposed in a displaceable manner so that when a tape end is reached on the supply hub, it is possible to provide a movement of the supply hub together with the supply shaft within the limited extent permitted by the rattling clearance of the tape hub. Such movement of the tape supply shaft may be detected to unlock an operating member which maintains the tape recorder in operation, thus automatically stopping the tape recorder. The present applicant has previously proposed an auto shut-off apparatus for a tape recorder which detects such movement of the tape supply shaft when a tape end is reached on the supply shaft during the transport of the tape in the forward direction, namely, during a record or playback mode.

In order to permit the use of similar means to provide an auto shut-off function of the tape recorder during a tape rewind mode, namely, during the transport of the tape in the opposite direction, a tape take-up shaft, that is, a shaft associated with a tape hub on which the tape is taken up during the tape transport in the forward direction, must also be supported in a displaceable manner. However, the displaceable arrangement of both the tape take-up and the tape supply shaft results in the loss of a stationary shaft which provides a reference to the movement, whereby the auto shut-off mechanism will become very complex and exhibit an unstable operation.

In a tape recorder, means for transmitting a rotating drive to a tape take-up shaft usually comprises a gear train or a transmission belt. Where a gear train is used, the rotating drive is transmitted to the tape take-up shaft from a drive gear through a plurality of intermediate gears. However, an increase in the number of transmission gears may give rise to the instability of rotation of the tape take-up shaft as a result of an increased error in the transmission of the rotating power due to a meshing misalignment between the gears. It will be understood that during the rewind mode, it is only necessary that the tape be driven in the opposite direction, and the tape transport in this direction need not consider the tape running speed or the speed of rotation of the rewind shaft, so that an increase in the number of gears does not present a problem. However, when the tape runs in the forward direction as in the record or playback mode, it is desirable that the tape take-up shaft exhibits a stabilized rotation so that it is capable of receiving the tape as it is forwardly fed at a uniform rate by the cooperation of a capstan and a pinch roller. Thus, it is undesirable that the system which drives the tape in the forward direction involves an increased number of gears.

SUMMARY OF THE INVENTION

It is an object of the invention to provide an auto shut-off apparatus for cassette tape recorders in which a tape supply shaft (which will be a tape rewind shaft during a tape rewind mode) associated with a tape supply hub is supported in a displaceable manner so as to permit a movement of the rewind shaft by a rotating drive applied thereto as a tape end is reached during rewind mode and wherein the cooperation between the movement of the tape rewind shaft and the rotation of a flywheel which is utilized to provide a uniform rotation of a capstan serves to automatically stop the recorder and return an operating member to its initial position.

It is another object of the invention to provide a rotary drive mechanism for a tape take-up shaft and a tape rewind shaft which avoids the described disadvantages of the conventional transmission mechanism which incorporates a gear train.

In accordance with the invention, there is provided a completely mechanical auto shut-off apparatus for a tape recorder in which an auto shut-off operation is achieved by the movement of only a tape rewind shaft or a tape supply shaft when the tape is fed in opposite directions.

Also in accordance with the invention, there is provided a rotary drive mechanism in which a single drive switching gear is interposed between the tape take-up shaft and the drive gear for rotatably driving the take-up shaft when the tape runs in the forward direction as in a record or playback mode. In this manner, the meshing misalignment between the gears is reduced, preventing or minimizing a transmission error so as to assure a stabilized rotation of the take-up shaft.

In the auto shut-off apparatus, there is provided a tape end detecting lever which supports the tape rewind shaft (or tape supply shaft) for angular movement about an idle gear when a tape end is detected. The lever is pivotally mounted on a stud which is fixedly mounted on and extends through a stationary baseplate and which rotatably carries the idle gear. Thus, the idle gear and the tape shaft drive gear is maintained in meshing engagement, preventing any instability during the auto shut-off operation.

DETAILED DESCRIPTION OF PREFERRED EMBODIMENT

Figure 1:
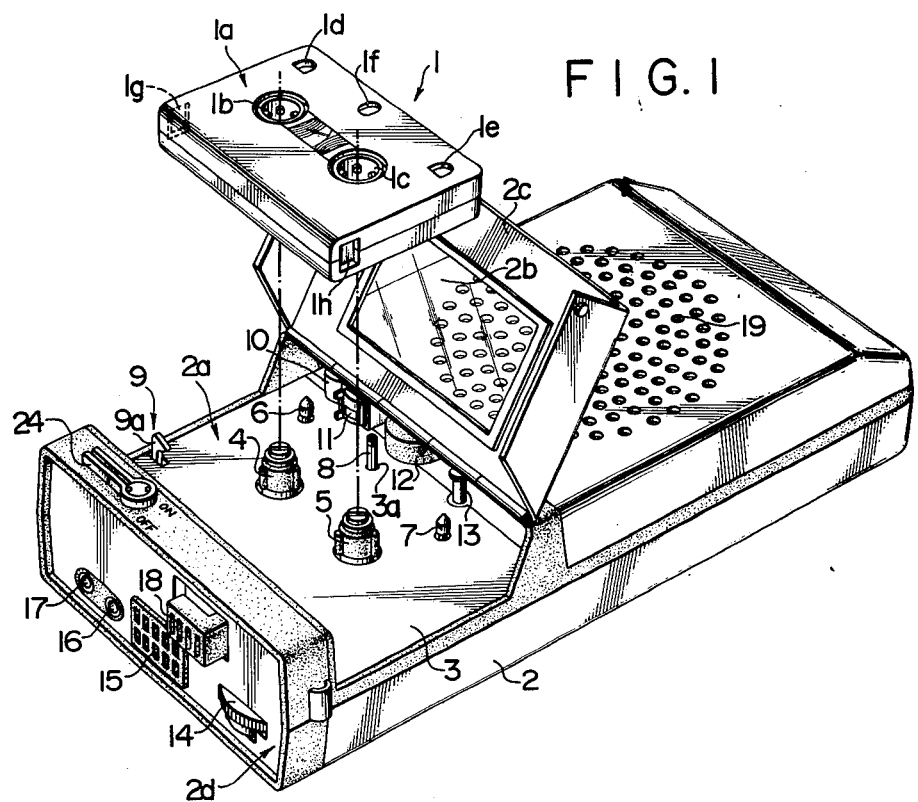
FIG. 1 is a perspective view of a cassette tape recorder according to the invention, also illustrating a tape cassette and a cassette receiving region of the recorder.
Figure 2:
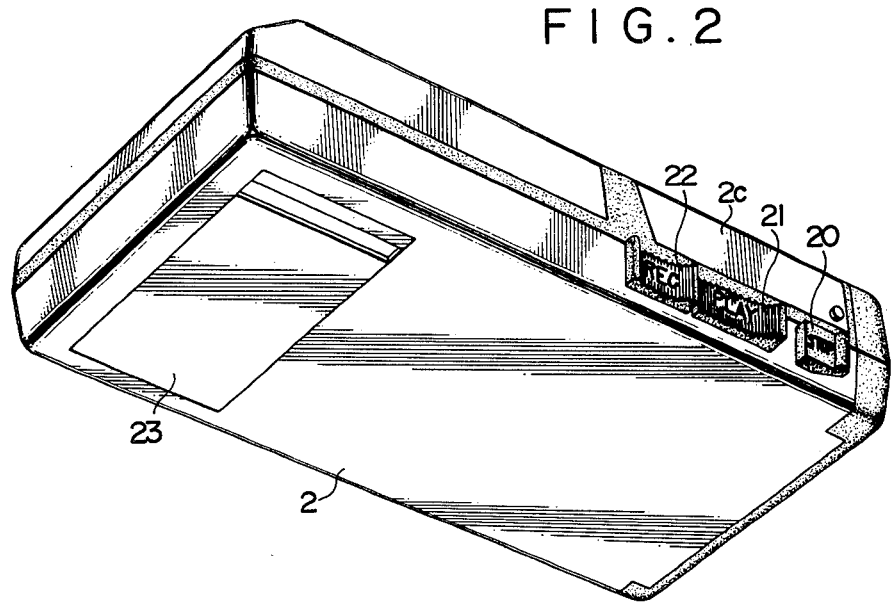
FIG. 2 is a perspective view of the recorder shown in FIG. 1 as viewed from the rear side thereof, particularly illustrating the backside and underside thereof.

Referring to FIGS. 1 and 2, there is shown a perspective view of a miniature tape recorder to which the invention is applied. It is to be understood that a micro-cassette 1 and a miniature tape recorder 2 in which the cassette is detachably loaded are both well known. It is to be understood initially that while the invention will be described below with reference to a miniature tape recorder utilizing a micro-cassette, the features of the invention including the auto shut-off apparatus and the rotary drive mechanism are equally applicable to a tape recorder which utilizes a compact tape cassette.

In FIG. 1, the front of the tape recorder 2 is located at the left-hand end while the right-hand end represents the rear part. A cassette receiving region 2a is formed in the upper half of the recorder toward the front end. The region 2a includes a panel 3 through which a tape supply shaft 4 (which will be a tape rewind shaft during a tape rewind mode) and a tape take-up shaft 5 (which will be a tape supply shaft during a tape rewind mode) extend at preselected locations. In addition, positioning pins 6, 7 for properly locating the loaded position of the tape cassette 1 as well as a capstan 8 for transporting the tape at a uniform rate, extend through the panel 3. Along one side of the cassette receiving region 2a and toward the front end, there is exposed a detecting member 9 extending through the panel 3, which member is adapted to detect a lug provided on the portion of a cassette loaded into the recorder for preventing an inadvertent erasure. As will be described later, the detecting member 9 operates to detect the presence or absence of the lug on the loaded cassette as a record button is operated.

An erase head 10, a record/playback head 11, a pinch roller 12, and a locking member 13 which prevents an inadvertent withdrawal of a cassette loaded into the recorder are located on a stationary baseplate to be described later, toward the inner end of the region 2a. The erase head 10 comprises a permanent magnet and is moved into contact with the magnetic surface of the tape contained within the loaded cassette for erasing an unnecessary recorded signal on its record track as a record button, to be described later, is moved to a given position. The head 11 is moved into contact with the magnetic surface of the cassette tape as a playback button is operated, for performing a recording or playback operation. The pinch roller 12 is moved into abutment against the capstan 8 with a tape portion held therebetween, as the playback button is operated. The cooperation between the pinch roller and the capstan serves to feed the tape.

As is well known, the micro-cassette 1 which is adapted to be loaded into the region 2a includes a cassette body 1a, and a pair of rotatable tape hubs 1b, 1c for receiving a tape wound thereon. The hubs 1b, 1c are adapted to "rattle" slightly with respect to the body 1a, and one tape hub 1b is adapted to fit over the tape supply shaft 4 while the other tape hub 1c is adapted to fit over the tape take-up shaft 5. Each of the hubs 1b, 1c includes inwardly extending projections which engage between outwardly extending projections of the respective shafts 4, 5. When one of the shafts 4, 5 is positively driven, both hubs rotate in the same direction, the tape disposed on one hub being unwound and then taken up on the other hub.

The micro-cassette 1 is also formed with positioning openings 1d, 1e, which respectively receive the positioning pins 6, 7, as well as a capstan aperture 1f. A pair of lugs 1g, 1h for preventing an inadvertent erasure are formed in each of the opposite sidewalls of the cassette. When the cassette 1 is loaded into the region 2a, the latter is closed by a movable cover 2c having a window 2b formed therein.

On its front end face, the recorder 2 is provided with an operation panel 2d in which are disposed a volume control 14, a grille 15 for an internally housed microphone, a jack 16 for connection with an external microphone and an earphone jack 17. In addition, an operating button 18 is disposed in the operation panel 2d for establishing a rapid tape advance, cue, tape rewind and review mode. A pause knob 24 is disposed on top of the recorder surface adjacent to the front end. A plurality of small air passage perforations 19 are formed in the upper surface of the recorder 2 toward its rear end, and a loudspeaker (not shown) is internally housed within the recorder at a position below the perforations.

As will be noted from FIG. 2, which is a bottom and rear view of the tape recorder 2 shown in FIG. 1 as viewed from the front and left-hand side, a record button 20, a playback button 21 and a stop button 22 are disposed in sequence on one sidewall of the recorder 2. When a playback mode of the recorder 2 is to be established, the playback button 21 is moved, by a sliding motion, to a given position toward the stop button 22. A record mode can be established by moving the both record and playback buttons 20 and 21 toward the stop button 22, by a sliding motion. When either the playback or record mode is to be released, the stop button 22 may be moved toward the front end of the recorder. In FIG. 2, numeral 23 represents a lid over a battery containing chamber.

The arrangement and operation of the internal mechanism will now be described. However, the electrical circuit of the tape recorder will not be described since it has no direct bearing with the present invention.

(1) Tape drive mechanism

A tape drive mechanism comprises the capstan mentioned above which transports a tape at a uniform rate, a flywheel for rotating the capstan at a uniform rate, a drive motor, and a drive transmission member which transmits the rotating power from the motor to the flywheel.

Figure 3A:
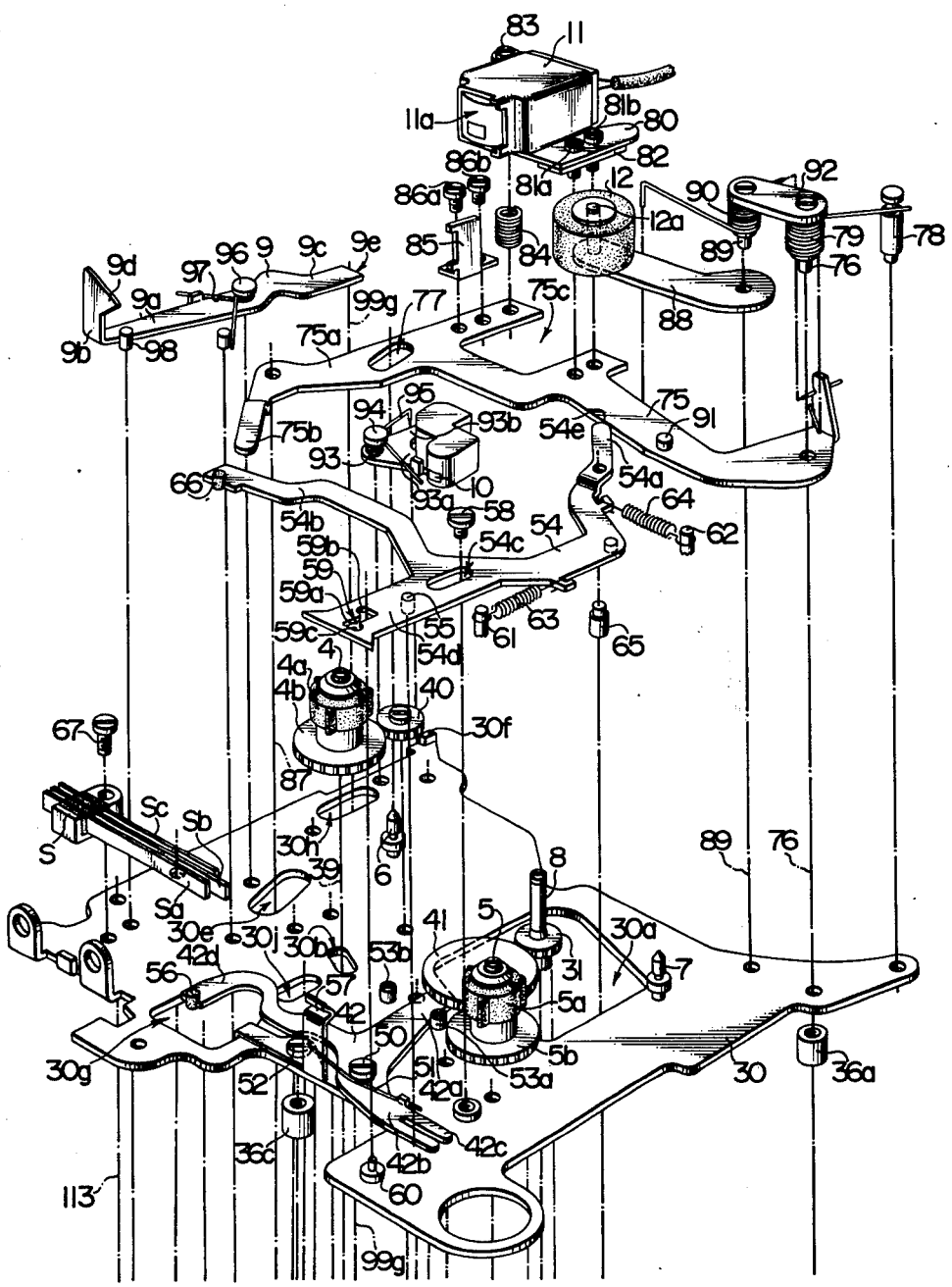
FIG. 3A is an exploded perspective view of various parts disposed on top of a stationary baseplate secured within the recorder.
Figure 3B:
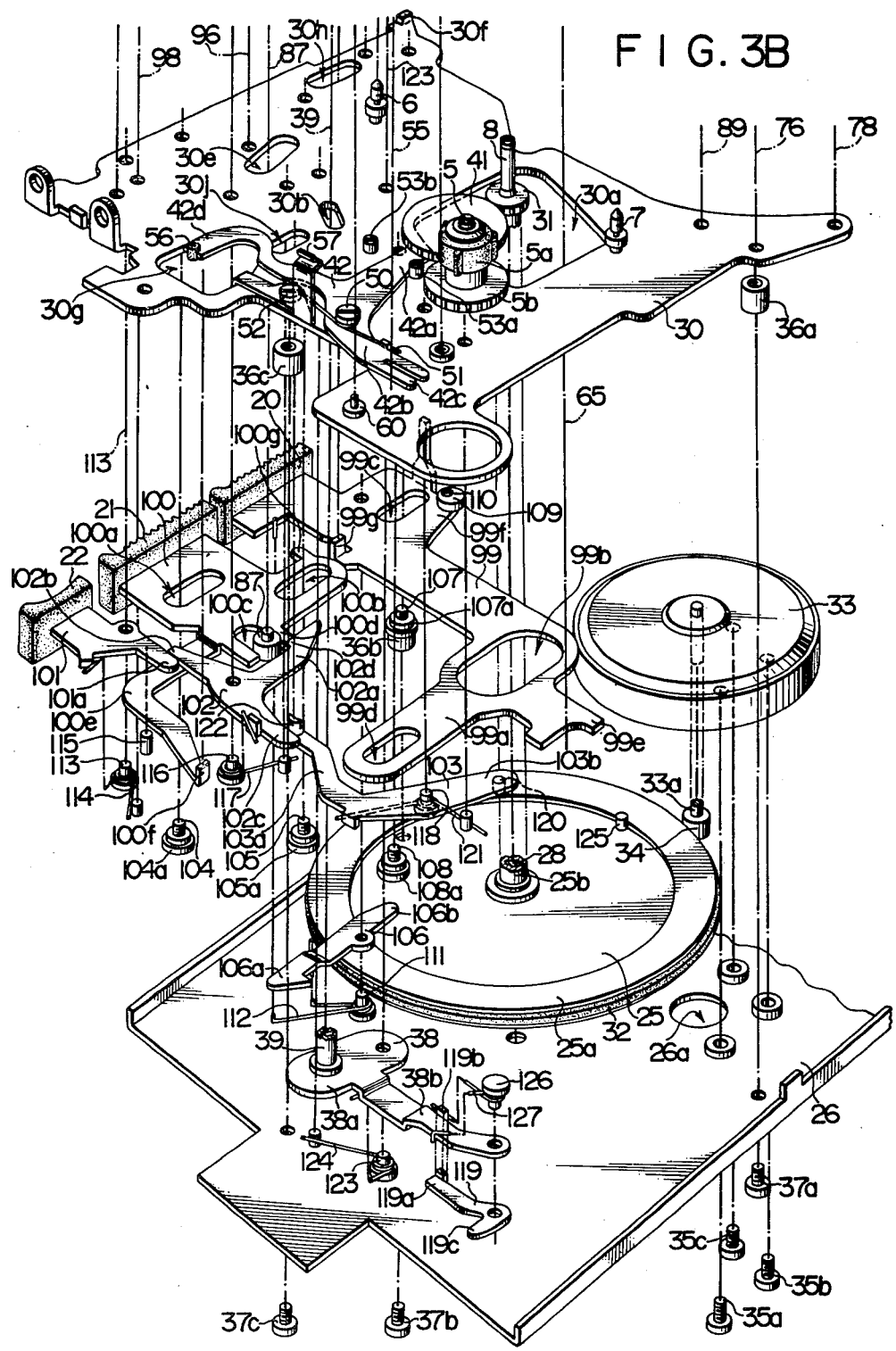
FIG. 3B is an exploded perspective view of various parts located on the underside or below the stationary baseplate.

Referring to FIG. 3B, the capstan 8 is integrally joined with a flywheel 25, and is rotatably mounted on a support plate 26 which is located below the panel 3 (see FIG. 1) and fixedly mounted within the recorder housing by suitable means. The periphery of flywheel 25 is formed with a portion 25a of an increased thickness, its center is formed with an upwardly extending stab shaft 25b, which is in turn formed with a step to provide a hollow shaft of a reduced diameter which serves as the capstan 8. The capstan 8 and its integral flywheel 25 are rotatably mounted on the support plate 26 by means of a support shaft 28, which is fixedly mounted on the support plate 26 through a suitable bearing and which tightly extends through the hollow shaft 8. A downward movement of the capstan 8 and flywheel 25 is prevented by the abutment of the inner surface of the step located between the stab shaft 25b and the capstan 8 against the upper end face of the bearing. An upward movement of the capstan 8 and flywheel 25 is prevented by a locking screw threadably engaging the upper end of the support shaft 28 and having a dished head which bears against the upper end face of the capstan 8. The capstan 8 extends through an opening 3a (see FIG. 1) formed in the panel 3 into the cassette receiving region 2a (FIG. 1).

A stationary baseplate 30 is located intermediate the panel 3 and the support plate 26 and is fixedly mounted on the latter. The baseplate 30 is formed with an opening 30a through which the stab shaft 25b of the flywheel 25 extends. Thus, the step formed at the upper end of the stab shaft 25b is located slightly above the upper surface of the baseplate 30. A drive gear 31 of reduced diameter is tightly fitted on the step, and is made integral with the stab shaft 25b as by shrinkage fit. The drive gear 31 meshes with a drive switching gear 41 disposed on the baseplate 30 and which will be described later with reference to FIGS. 3A as well as FIG. 3B and FIG. 4.

The peripheral surface of the flywheel 25 is formed with a groove which is tightly engaged by a drive transmission member in the form of a drive belt 32 for rotatively driving the flywheel 25. The belt 32 comprises an endless belt of a rubber material having a high coefficient of friction, and naturally forms a loop of a diameter which is slightly less than the diameter of the flywheel 25. The belt 32 is fitted into the peripheral groove by slightly stretching the belt, so as to dispose it in bearing engagement with a wheel 34 fixedly mounted on an output shaft 33a of a miniature motor 33 (see FIG. 3B) for transmitting the rotating drive of the motor 33 to the flywheel 25. The motor 33 is mounted on the support plate 26 by means of set screws 35a, 35b, 35c, with its output shaft 33a extending in the downward direction. The output shaft 33a extends toward an opening 26a formed in the support plate 26. In this manner, the output wheel 34 of the motor is directly (frictionally) coupled with the flywheel 25 in the tape recorder of the invention. It will be understood that the rotating drive of the motor 33 is transmitted through the wheel 34, belt 32 and flywheel 25 to the capstan 8, which is therefore driven for rotation at a uniform rate to feed the tape at a uniform rate by cooperation with the pinch roller 12 (FIG. 1).

(2) Drive mechanism for tape supply and tape take-up shafts

This mechanism is adapted to selectively drive one of the tape supply shaft 4 (which will be a tape rewind shaft during a tape rewind mode) and the tape take-up shaft 5 (which will be a tape supply shaft during a tape rewind mode) both rotatably mounted in the baseplate 30, thus rotating such shaft by the drive from the capstan 8.

Figure 4:
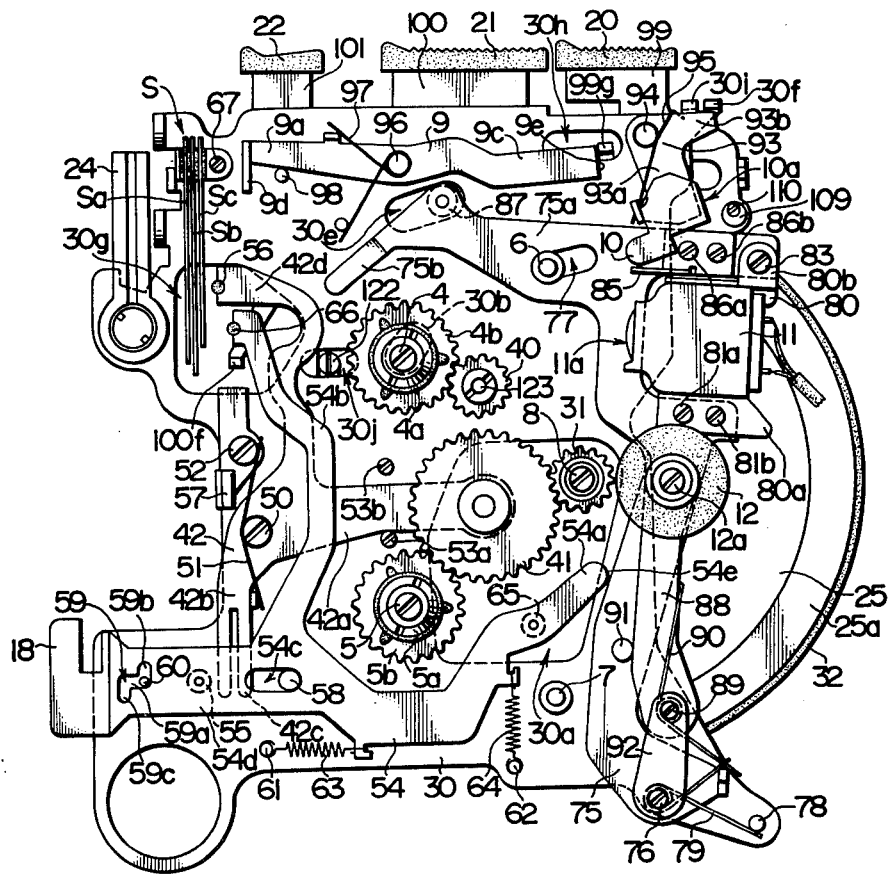
FIG. 4 is a plan view of various parts disposed on top of the baseplate, including a rotary drive mechanism of the invention.

As shown in FIG. 3B, the baseplate 30 is fixedly mounted on the support plate 26 by means of spacers 36a, 36b, 36c and set screws 37a, 37b, 37c. As shown in FIGS. 3A, 3B and 4, the shafts 4, 5 are located centrally toward the left of the baseplate 30 so as to assume symmetrical positions with respect to the capstan 8. Before describing various parts, it should be noted that the baseplate 30 is shown in FIGS. 3 and 4 in an orientation such that its left-hand side corresponds to the operation panel 2d shown in FIG. 1. Every part mounted on the baseplate 30 is shown in top view, and parts mounted on the underside of or located below the baseplate 30 are shown as viewed through the baseplate 30.

Referring to FIGS. 3A, 3B and 4, the tape supply shaft 4 is rotatably mounted on a support shaft 39 which is fixedly mounted on one arm 38a of a tape end detecting lever 38 which is in turn pivotally mounted on the underside of the baseplate 30. As will be described later, the detecting lever 38 is adapted to be driven for angular movement about its pivot by a rotating drive applied to the shaft 4, which is transmitted to the lever through the shaft 4, as a tape end is reached during the tape transport in the forward direction, thus automatically stopping the tape recorder 2. The support shaft 39 extends through an arcuate opening 30b formed in the baseplate 30 and having a sufficient clearance with respect to the shaft, and the tape supply shaft 4 is rotatably mounted on the top end of the support shaft 39. The tape supply shaft 4 comprises a fitting portion 4a which is adapted to fit in the tape hub 1b, a drive gear 4b, and a slip mechanism interposed between the fitting portion 4a and the drive gear 4b. During a tape rewind mode and a review mode, the rotating drive transmitted to the drive gear 4b is transmitted through the slip mechanism to cause the fitting portion 4a to rotate in the counter-clockwise direction, thus rotating the tape hub 1b to take up the tape thereon. The drive gear 4b meshes with an idle gear 40 which is rotatably mounted adjacent thereto and through which the rotating drive is transmitted to the gear 4b. The gear 40 has a support shaft 123 which pivotally carries the detecting lever 38 on the underside of the baseplate 30.

On the other hand, the tape take-up shaft 5 is disposed toward the left and the downward side of the baseplate 30, as viewed in FIG. 4, and fits into the other tape hub 1c of the cassette. The shaft 5 is symmetrically located relative to the shaft 4 with respect to the capstan 8, and is rotatably mounted on a stationary shaft, not shown, which is secured to the baseplate 30. The shaft 5 also comprises a fitting portion 5a which mates with the hub 1c, a drive gear 5b, and a slip mechanism interposed between the gear 5b and the fitting portion 5a. A rotating drive is transmitted to the drive gear 5b during a record, playback, rapid tape advance and cue mode of the recorder, thereby rotating the portion 5a and hence the hub 1c clockwise through the slip mechanism to take up the tape thereon. The rotating drive to the gear 5b is transmitted from the drive gear 31 through a drive switching gear 41 which meshes with the gear 5b. The drive switching gear 41 is rotatably mounted on a drive switching lever 42 to be described later, and normally meshes with the drive gear 31 on the capstan 8 and the drive gear 5b, thus transmitting the rotation of the capstan to the drive gear 5b for rotation of the tape take-up shaft 5. The rotating drive to the drive gear 4b of the tape supply shaft 4 is transmitted through the meshing engagement between the switching gear 41 on one hand and the drive gear 31 and the idle gear 40 on the other hand, which is achieved by rocking the drive switching lever 42 counter-clockwise about its pivot to angularly move the gear 41 clockwise about the drive gear 31 on the capstan 8.

In this manner, the rotary drive mechanism of the invention which drives the tape shafts is adapted to drive either tape shaft selectively by the switching action of the drive switching gear 41. The rotary drive mechanism is characterized by the presence of the single drive switching gear 41 in the transmission path between the tape take-up shaft 5 and the drive gear 31 during a record, playback and cue operation when a stabilized tape running speed is desired in the forward direction of the tape running. Such an arrangement is desirable since the presence of an increased number of gears in the transmission path from the drive source to the tape take-up shaft will increase a transmission error to cause an instability in the rotation of the tape take-up shaft, as mentioned previously.

Referring to FIGS. 3A and 4, the drive switching lever 42 is pivotally mounted at 50 on the baseplate 30 toward the left-hand edge thereof. The lever 42 includes three arms, including a first arm 42a extending toward the capstan 8 and rotatably carrying the drive switching gear 41 on the distal end thereof. The lever 42 is urged to rotate clockwise about the pivot 50 by a torsion spring 51 having its one end anchored to a second arm 42b of the lever 42 and its other end engaged with a screw 52 which is threadably engaged with the baseplate 30. However, the resulting rotation of the lever 42 is normally prevented by the abutment of the first arm 42a against a stop pin 53a fixedly mounted on the stationary baseplate 30. In this position, the drive switching gear 41 is maintained in meshing engagement with the drive gear 31 and the drive gear 5b. As will be mentioned below, the drive switching lever 42 is adapted to rotate counter-clockwise about the pivot 50 as a tape rewind member 54 is depressed. The resulting rotation is limited by the abutment of the first arm 42a of the lever 42 against a stop pin 53b fixedly mounted on the baseplate 30. When the lever assumes such position, the drive switching gear 41 is maintained in meshing engagement with the idle gear 40. The second arm 42b extends in a direction perpendicular to the first arm 42a or downward as viewed in FIG. 4, over the baseplate 30, and its distal end 42c is forked. The purpose of providing the forked distal end 42c of the second arm 42b is to provide an optimum degree of meshing engagement between the drive switching gear 41 and the idle gear 40 as a tape rewind member 54 is depressed to cause a depending pin 55 therefrom to drive the forked end 42c to move the lever 42 counter-clockwise. Specifically, by adjusting the gap width of the forked end and the distance between the forked end 42c and the depending pin 55, the degree of meshing engagement between the drive switching gear 41 and the idle gear 40 can be adjusted as the lever 42 rotates counter-clockwise.

The lever 42 includes a third arm 42d which extends in the opposite direction from the second arm 42b and which is formed with a U-shaped distal end, which is open toward the left-hand edge of the baseplate 30 as viewed in FIG. 4. The distal end has an electrically insulating member 56 secured to the extremity thereof. The third arm 42d forms a switch actuating member, and the insulating member 56 is located opposite to a main switch S which is mounted on the baseplate 30 by means of a set screw 67. The main switch S comprises three conductive movable blade contacts Sa, Sb, Sc. When the movable contacts Sa and Sb engage with each other, the motor 33 (shown in FIG. 3B) is driven for rotation at a uniform rate, and when the three contacts Sa, Sb, Sc all engage with each other, the motor 33 is driven for rotation at a higher rate. The insulating member 56 operates to bring all of the three movable contacts Sa, Sb, Sc into engagement with each other to cause a rotation of the motor 33 at the higher rate, by pushing against the contact Sc when the lever 42 is rotated counter-clockwise about the pivot 50.

The torsion spring retaining screw 52 also functions to secure a cassette retaining spring 57 to the baseplate 30. The retaining spring 57 comprises a thin, resilient blade having a riser portion which extends along the left-hand edge of the cassette receiving region 2a (see FIG. 1) to bear against one end face of a loaded cassette to urge the positioning openings 1e, 1d (FIG. 1) against the positioning pins 6, 7.

The tape rewind member 54 is disposed in a floating manner over the baseplate 30 at a position below the drive switching lever 42, as viewed in FIG. 4. Referring to FIG. 4, the tape rewind member 54 includes a first arm 54a extending to the right, a second arm 54b extending upward and a third arm 54d extending to the left, generally forming an inverted T-shaped configuration. The member 54 is centrally formed with an elongated guide slot 54c, which is engaged by a stud 58 fixedly mounted on the baseplate 30, thus making member 54 displaceable. The slot 54c extends in the direction of the first and third arms, and the rewind member 54 is capable of a sliding movement over the length of the slot 54c and an angular movement about the stud 58. These movements are triggered by the depression of the operating button 18 which is secured to the outer end of the third arm 54d.

The third arm 54d of the tape rewind member 54 is formed with a slot 59 for controlling the direction of the movement of the member and for locking the member in its tape rewind position. Specifically, the slot 59 is formed adjacent to the outer end of the third arm 54d, and includes a long slot portion 59a extending lengthwise of the third arm 54d, a short slot portion 59b extending upward from the inner end of the slot portion 59a, and a short slot portion 59c extending downward from the outer end of the slot portion 59a, thus resulting in a key-hole configuration. The slot 59 is engaged by a pin 60 fixedly mounted on the baseplate 30.

The forked distal end 42c of the lever 42 extends below a region of the third arm 54d located between the slots 59 and 54c. The pin 55 depends downwardly from the third arm 54d at a position between the distal end 42c and the slot 59 for operating the distal end 42c. The first arm 54a has a slant formed in it intermediate its length, extending obliquely upward, and its distal end extends toward the capstan 8. A pair of pins 61, 62 are fixedly mounted on the baseplate 30, and a pair of coiled tension springs 63, 64, acting as return springs, respectively have one end anchored to these pins and the other end engaged with hoop-like projections provided along the first arm 54a. As a consequence, the tape rewind member 54 is biased by the spring 64 for clockwise rotation about the stud 58, and is also biased by the spring 63 for a sliding movement to the left with respect to the baseplate 30. However, the tendency of the member 54 to slide to the left is normally blocked by the abutment of the right-hand edge of the guide slot 54c against the stud 58, and the tendency of the member 54 to rotate clockwise is blocked by the abutment of the right-hand edge of the long slot portion 59a against the pin 60.

Figure 5:
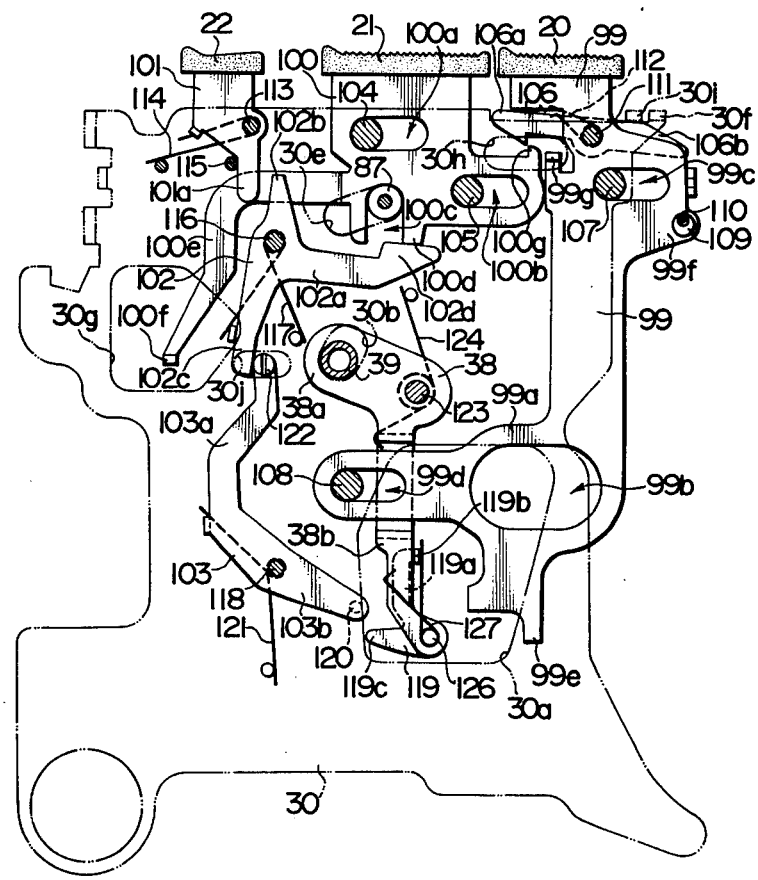
FIG. 5 is a plan view of various parts disposed on the underside or below the baseplate of FIG. 4, as viewed through the baseplate.
Figure 6:
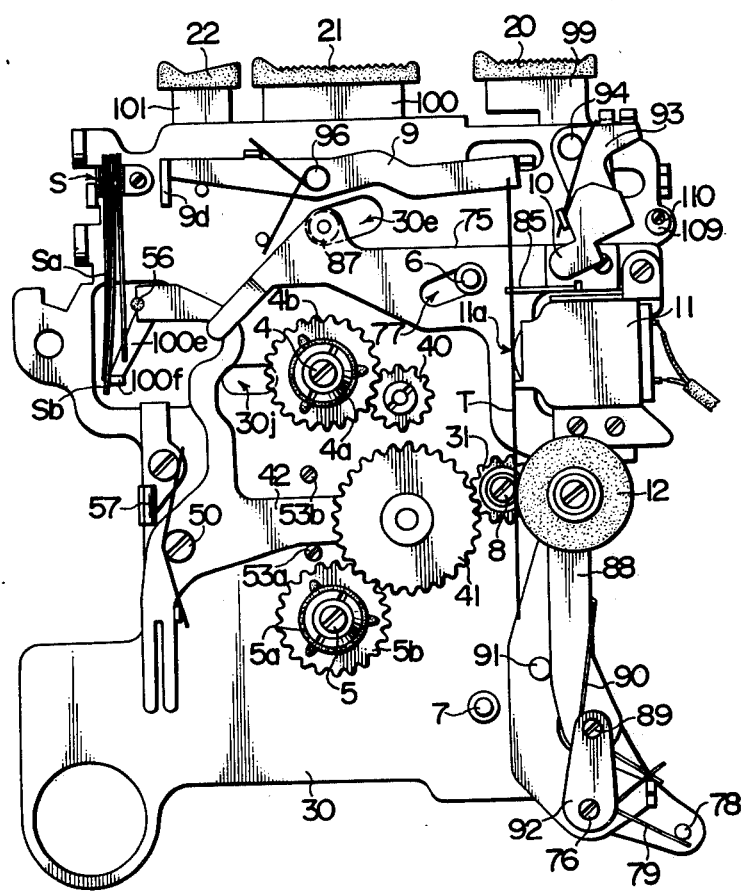
FIGS. 6 and 7 are views similar to FIGS. 4 and 5, respectively, illustrating the operation of various parts during a playback mode of the recorder.
Figure 7:
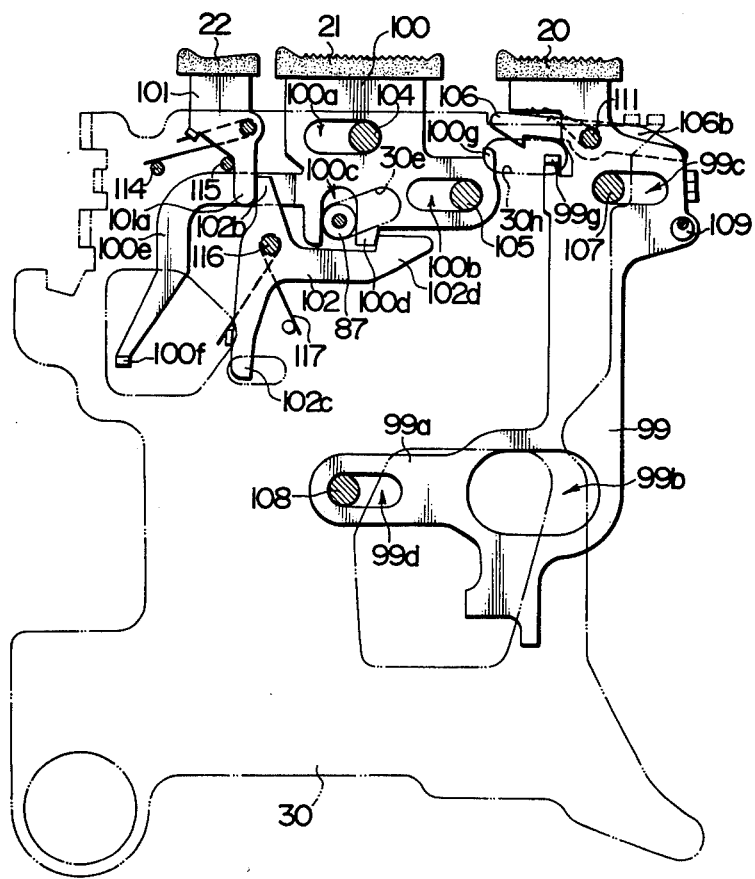

A downwardly depending pin 65 is fixedly mounted on the first arm 54a adjacent to the distal end thereof, and extends through the opening 30a formed in the baseplate 30. The purpose of the pin 65 is to disable the depression of the tape rewind member 54 when the tape recorder 2 is in its record mode. Specifically, when the depression of the operating button 18 is attempted to move the rewind member 54 inward and along the baseplate 30, the pin 65 abuts against a projection 99e (see FIG. 5) of a record member 99 to be described later, thus blocking a movement of the rewind member 54.

The distal end 54e of the first arm 54a is located opposite to the inner edge of a pinch roller support arm 88 to be described later. In the playback mode of the tape recorder, when the tape is rewound to permit a review operation, the distal end 54e moves the pinch roller support arm 88 as the tape rewind member 54 moves, thus moving the pinch roller 12 away from the capstan 8.

The second arm 54b extends above the drive switching lever 42 and extends in the same direction as the third arm 42d thereof to form a switch actuating arm. Specifically, the distal end of the second arm 54b is located adjacent to the distal end of the third arm 42d so as to be located to the main switch S. An electrically insulating member 66 for operating the main switch S is secured to the extremity thereof. The insulating member 66 functions in a manner similar to the insulating member 56 and is located opposite the movable contact Sc of the main switch S so that it brings all of the movable contacts Sa to Sc of the main switch S into engagement with each other to cause rotation of the motor 33 at the higher rate for a rapid tape advance in response to movement of the operating button 18 to rotate the tape rewind member 54 counter-clockwise about the stud 58.

It will be understood that the tape rewind member 54 enables a rapid tape advance in addition to a tape rewind operation, and when a rapid tape advance is activated during the playback mode of the tape recorder, a cue operation is enabled. Similarly, a tape rewind operation during the play-back mode enables a review operation. In this manner, the rotating drive from the capstan 8 is transmitted to either tape take-up shaft 5 or tape supply shaft 4 through the drive switching gear 41, thus properly driving one of these shafts. However, the rotating drive from the capstan 8 is normally transmitted to drive the tape take-up shaft 5 as shown in FIG. 4 since the drive switching lever 42 which supports the drive switching gear 41 is rotated clockwise about the pivot 50 under the resilience of the spring 51.

(3) Mechanism for enabling record, playback, stop, rapid tape advance, rewind and auto shut-off operations.

This mechanism is adapted to make the erase head 10, record/playback head 11 and pinch roller 12, which are movably disposed on the stationary baseplate 30, either operative or inoperative in response to an operation of the record, playback and stop members which are disposed below the baseplate 30. Referring to FIGS. 3A and 4, a head support plate 75 carrying the head 11 is rockably mounted on a pivot 76 fixedly mounted on the baseplate 30 at a position over the baseplate 30 toward the lower right-hand end thereof, as viewed in FIG. 4. The support plate 75 extends generally along the right-hand edge, as viewed in FIG. 4, of the baseplate 30 and then extended to the left, forming a guide arm 75a, the distal end of which extends to the proximity of the tape supply shaft 4. The guide arm 75a is formed with an elongate guide slot 77 which is in the form of an arc centered about the pivot 76. The slot 77 is engaged by the cassette positioning pin 6 which is fixedly mounted on the baseplate 30, thus making the head support plate 75 rockable counter-clockwise about the pivot 76. However, the support plate 75 is normally biased to rotate clockwise about the pivot 76 by a torsion spring 79 having its one end anchored thereto and its other end engaged with a pin 78 fixedly mounted on the baseplate 30. The resulting rotation of the support plate is limited by the pin 6, and the support plate 75 remains at rest in this position.

The record/playback head 11 is disposed on the middle portion of the head support plate 75. The head 11 is located so that its head surface 11a faces the tape supply shaft 4, and is mounted on the support plate 75 by means of a single thin, resilient head mounting plate 80. One end of the head mounting plate 80 which is located nearer the pivot 76 is secured to the support plate 75 by means of a pair of set screws 81a, 81b, with a spacer 82 interposed therebetween. The other end of the plate 80 is bent at right angles to extend upwardly, and this vertically extending portion is partly folded outwardly to extend in a horizontal plane, thus forming an adjusting piece 80b. A relatively long adjusting screw 83 extends through the adjusting piece 80b from above, and is threadably engaged with the head support plate 75 by passing through a coiled compression spring 84 which is interposed between the piece 80b and the support plate 75. In this manner, the head 11 is supported by the support plate 75 in a cantilever fashion, and the elevation and horizontal position thereof can be adjusted by turning the adjusting screw 83.

In accordance with the invention, the head mounting structure is sophisticated in a manner to be described below. A portion of the support plate 75 is notched in the region of the head mounting plate 80, which therefore can be moved into the notch 75c (see FIG. 3A). With this arrangement, when the screw 83 is turned to adjust the elevation and the azimuth of the head 11 relative to the tape, the head 11 and the mounting plate 80 can be brought into the notch 75c, enabling the thickness of the tape recorder to be reduced. It will be noted in FIGS. 3A and 4 that a tape guide member 85 is located adjacent to the adjusting screw 83 and is secured to the support plate 75 by means of set screws 86a, 86b.

A downwardly depending actuator pin 87 is fixedly mounted on the support plate 75 between the guide arm 75a and the distal end 75b thereof, and extends through an elongate guide slot 30e formed in the baseplate 30 and which moves along an arcuate path whose center is the pivot 76, for fitting engagement with a forked portion 100c of a playback member 100 (see FIG. 5) to be described later. When the playback member 100 operated, the actuator pin 87 moves within the slot 30e to cause an angular movement of the support plate 75 about the pivot 76, thus moving the head 11 to its operative position.

A pinch roller support arm 88 is rockably disposed on the support plate 75. Specifically, one end of the support arm 88 is rockably mounted on a pivot 89 which is fixedly mounted on the baseplate 30 adjacent to the pivot 76 of the support plate 75. The other end of the support arm 88 extends to the proximity of the head 11 and has a shaft 12a fixedly mounted thereon for rotatably carrying the pinch roller 12 at a position opposite the capstan 8. The support arm 88 is biased for counter-clockwise rotation about the pivot 89 by a torsion spring 90 having its one end anchored to the support arm and its other end engaged with the head support plate 75. However, the resulting rotation of the support arm 88 is normally blocked by a stop pin 91 fixedly mounted on the support plate 75. When the support plate 75 rotates counter-clockwise about the pivot 76, the support arm 88 for the pinch roller is able to follow the movement of the support plate 75 by turning counter-clockwise about the pivot 89, thus bringing the pinch roller 12 into abutment against the capstan 8. A retaining plate 92 is secured to the upper end faces of the pivots 89, 76 for preventing the withdrawal of the torsion springs 90, 79 from these pivots.

A support member 93 for the erase head 10 is located on the substrate 30 at a position adjacent to the location of the head 11. The support member 93 comprises an L-shaped rockable lever having its central portion mounted on a pivot 94 which is in turn fixedly mounted on the baseplate 30. The member 93 has one arm 93a which extends toward the head 11, and the erase head 10 is fixedly mounted on the distal end of this arm. In the present embodiment, the erase head 10 comprises a permanent magnet which is molded in a synthetic resin material. The support member 93 is biased for counter-clockwise rotation about the pivot 94 by a torsion spring 95 disposed thereon and having its ends engaged with the baseplate 30 and a tab provided along the arm 93a. However, the resulting rotation is blocked by the abutment of another arm 93b against a vertical piece 30f bent upwardly from the right-hand end of the upper edge of the baseplate 30. The arm 93b extends rearwardly along the upper edge of the baseplate 30 or to the right as viewed in FIG. 4. During a record mode, the erase head 10 can be moved into a position in which its head surface bears against the magnetic tape, by a pusher 109 attached to the record member 99 to be described later.

The lug detecting member 9 which detects the presence or absence of lugs 1g, 1h provided along the sidewalls of the cassette loaded into the recorder is centrally located on the baseplate 30 along its upper edge. The lug detecting member 9 comprises a lever extending along the upper edge of the baseplate 30, and has its central portion mounted on a pivot 96 fixedly mounted on the baseplate 30. The member 9 has one arm 9a extending to the left, as viewed in FIG. 4, the free end of which is bent in the upward direction as shown at 9b to provide the lug detecting piece 9d (shown in FIG. 1) which extends into the cassette receiving region 2a of the tape recorder along one side thereof. The detecting piece 9d operates to detect the presence or absence of one of the lugs, for example, lug 1g, of the cassette loaded into the recorder.

The lug detecting member 9 has another arm 9c which extends in the opposite direction from the arm 9a and which is provided at its free end with a blocking piece 9e which blocks movement of the record member to its operative position when the lug is absent. The lug detecting member 9 is biased for counter-clockwise rotation about the pivot 96 by a torsion spring 97 disposed thereon, but the resulting rotation is normally prevented by the abutment of its arm 9a against a stop pin 98 fixedly mounted on the baseplate 30. Under this condition, the blocking piece 9e bears against a riser piece 99g of the record member 99 to constrain its movement.

The above has described parts which are disposed on or above the baseplate 30. Now, referring to FIGS. 3B and 5, parts located on the underside or below the baseplate 30 will be described. These include the record member 99, playback member 100, stop member 101, locking member 102 for maintaining the playback member 100 in its playback position, tape end detecting lever 38 and release lever 103. The record, playback and stop members 99, 100, 101 are disposed side by side along the upper edge, as viewed in FIG. 5, of the baseplate 30. Specifically, the playback member 100 is centrally located, and the record member 99 is located on the right-hand side thereof while the stop member 101 is located on the left-hand side thereof. The record and playback members 99, 100 each comprise a slidable plate which moves from right to left, as viewed in FIG. 5, relative to the baseplate 30 when operated. Thus, the playback member 100 is spaced from the stop member 101 by a distance through which the playback member 100 is movable. The stop member 101 comprises a rockable member. The outer end of each of the members 99, 100, a tape cassette, the detecting lever being adapted to rock as a tape end is reached during a tape rewind mode to stop the movement of a running tape in response to a movement of the tape rewind shaft which occurs as a result of a rotating drive transmitted thereto, an abutment lever pivotally mounted on another arm of the tape end detecting lever and adapted to be brought into the path of rotation of a release pin on a capstan driving flywheel so as to be driven by the pin for rocking motion when the tape end detecting lever rocks, a tape rewind member supported on the baseplate in a floating manner so as to be capable of a sliding and rocking movement, a sliding movement of the rewind member inward along the baseplate being effective to switch a rotating drive to a tape rewind system in order to establish a tape rewind mode of the tape recorder, locking means for maintaining the tape rewind member in its operative position which establishes the tape rewind mode, a release lever pivotally mounted on the baseplate and adapted to be rocked by the abutment lever as the latter rocks for driving and unlocking the tape rewind member which has been maintained in its operative position, and means for retracting the abutment lever from the path of rotation of the release pin by maintaining the tape end detecting lever in a manner such that the tape rewind shaft remains stationary at its home position which it assumes relative to a tape supply shaft during a tape rewind mode.

2. A cassette tape recorder according to claim 1 in which the abutment lever, which is pivotally mounted on the end of said another arm of the tape end detecting lever, normally forms a twin lever with the detecting lever.

3. A cassette tape recorder according to claim 1 in which the release pin is fixedly mounted adjacent to the periphery of the capstan driving flywheel which is rotatably driven by a motor.

4. A cassette tape recorder according to claim 1 in which the tape rewind member is made slidable and rockable by the provision of a single elongate slot formed therein intermediate its ends and extending along the direction of sliding movement thereof and which is engaged by a stud fixedly mounted on the baseplate, the tape rewind member being biased by return spring for movement in directions which are opposite to the direction of the sliding and rocking movements.

5. A cassette tape recorder according to claim 1 in which the locking means comprises a substantially L-shaped slot including a slot portion which is elongate along the sliding direction of the tape rewind member and a short slot portion which communicates with the elongate slot portion and extends along the direction of the rocking movement of the tape rewind member, and a pin fixedly mounted on the baseplate and engaging the slot, the tape rewind member being locked under its own bias when it is slidably moved along the elongate slot portion and then rocked to bring the pin into the short slot portion.

6. A cassette tape recorder according to claim 1 in which the extent of the rocking movement of the tape end detecting lever is limited by an opening formed in the baseplate through which the tape rewind shaft mounted on one arm of the lever extends, the tape end detecting lever being biased by a spring to a rocked position in which the tape rewind shaft is maintained stationary at the home position by retracting the abutment lever away from the path of rotation of the release pin during a tape rewind mode.

7. A cassette tape recorder according to claim 1 in which the tape end detecting lever is rockably mounted on a shaft which also carries an idle gear which in turn meshes with a drive gear coaxially mounted on the tape rewind shaft.

8. A cassette tape recorder according to claim 6 in which the opening in the baseplate is an elongated slot in the form of an arc of a circle.

9. A cassette tape recorder according to claim 6 in which the spring comprises a torsion spring disposed on a shaft which supports the tape end detecting lever.

10. A cassette tape recorder having an auto shut-off apparatus which is operable during a tape rewind mode of the tape recorder, said cassette tape recorder comprising:

a tape take-up shaft which takes up a tape thereon when the tape is fed in the forward direction during a record or play-back mode and a first gear coaxially mounted upon said tape take-up shaft;

a tape rewind shaft for rewinding the tape from the tape take-up shaft and a second gear coaxially mounted on and transmitting rotating drive to said tape rewind shaft;

an idle gear pivotally mounted upon a stationary baseplate provided within the tape recorder and maintained in meshing engagement with said second gear;

a capstan drive, including a fixed capstan shaft for feeding the tape;

a drive gear and a flywheel coaxially and fixably mounted on said capstan shaft;

a drive switching lever pivotally mounted at a point on the stationary baseplate which is displaced from the axis of said capstan shaft;

bias means for urging the drive switching lever to rock in a given direction;

a drive switching gear rotatably mounted on said drive switching lever a spaced distance from the pivotal mounting of the drive switching lever, said drive switching gear being normally maintained in meshing engagement with said drive gear and said first gear by said bias means;

manually operable means for moving said drive switching gear into meshing engagement with said drive gear and said idle gear against said bias means for the purpose of performing a tape rewind operation;

a tape end detecting lever pivotally mounted on said stationary baseplate and having an arm swingable about its pivotal mounting and adapted to support said second gear and said tape rewind shaft whereby said tape rewind shaft is adapted to receive one tape hub of a tape cassette;

said second gear being adapted to revolve about said idle gear while rotating about its own central axis in response to a tape end being reached as a result of the rotating drive of said drive gear being transmitted to said rewind shaft, and the revolution of said second gear in turn being imparted to said detecting lever to cause said detecting lever to rock about its pivot; and means responsive to the rocking of said detecting lever to stop the driving of the running tape.

11. A cassette tape recorder according to claim 10 wherein said drive switching lever is pivotally supported on a shaft mounted on the stationary baseplate and wherein said bias means comprises a torsion spring disposed on said shaft supporting said drive switching lever.

* * * * * of movement of the riser piece 99g, enabling movement of the record member 99 to its operative position.

Figure 9:
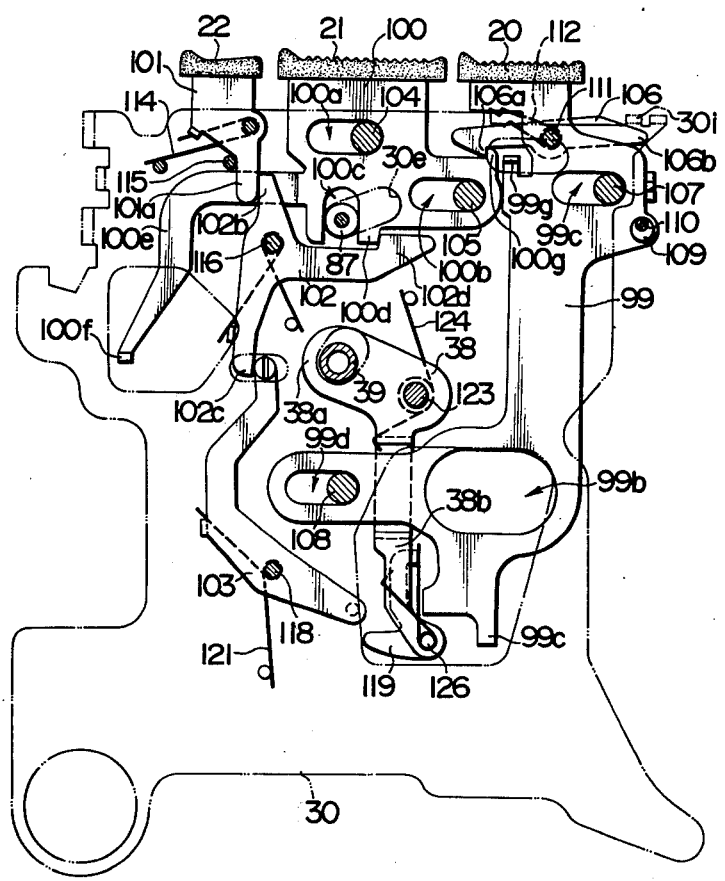

When movement of the record member 99 is allowed, both members 99, 100 slide in an integral manner as a result of the hook 100g of the playback member 100 being engaged by the hook-shaped end 106a of the connecting member 106 mounted on the record member 99, as shown in FIG. 9. Specifically, when the record member 99 moves to the left, as viewed in FIG. 5, the connecting member 106 rockably mounted thereon moves together therewith, moving the arm 106b away from the depending piece 30i which has been constraining a rocking movement thereof. Thus, the member 106 rocks counterclockwise about the pivot 111 under its own bias, bringing its hook-shaped end 106a into engagement with the hook 100g of the playback member 100, thus allowing an integral movement of both members 99, 100 to their operative position. The resulting operation which occurs as a result of a movement of the playback member 100 to its operative position is exactly same as mentioned above under the paragraph of playback operation, and therefore will not be repeated.

Figure 8:
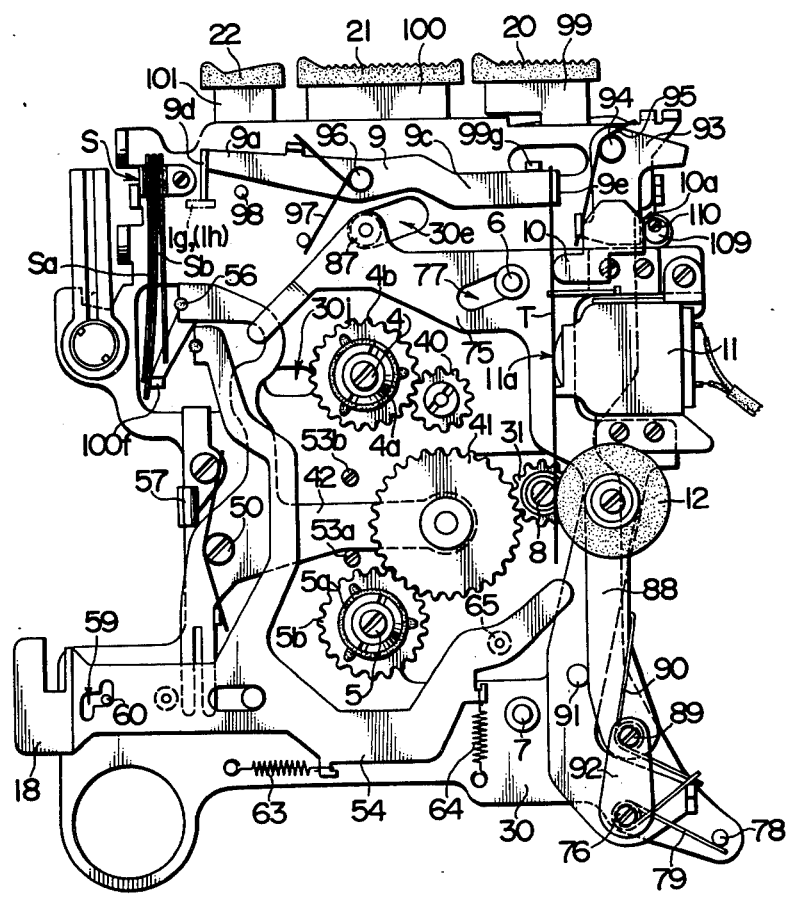
FIGS. 8 and 9 are views similar to FIGS. 4 and 5, respectively, illustrating the operation of the various parts during a record mode of the recorder.

When the record member 99 slides under the guiding action of the support shafts 107, 108 as the playback member 100 moves, the pusher member 109 mounted on the upper portion thereof drives the side 10a of the erase head 10 as shown in FIG. 8, thereby rotating the erase head support member 93 clockwise about the pivot 94 against its own bias to locate the erase head 10 in its operative position in which it bears against the tape T, thus allowing unnecessary signals on the tape to be erased.

When both members 99, 100 have moved to their operative position, the playback member 100 is locked in its operative position by the locking member 102 as is the record member 99 which is operatively connected therewith through the connecting member 106. Thus, as shown in FIGS. 8 and 9, the erase head 10 becomes operative in response to a movement of the record member 99 to its operative position while the record/playback head 11 becomes operative in response to a movement of the playback member 100 to its operative position. In the operative position of the record member 99, the depending pin 65 (see FIG. 8) from the tape rewind member 54 abuts against the projection 99e on the reocrd member 99, thus disabling an operation of the tape rewind member. The purpose of disabling the tape rewind member 54 during a record mode is to prevent a rapid tape advance, rewind, cue and review operation from being inadvertently performed during such mode.

(C) Stop

Figure 10:
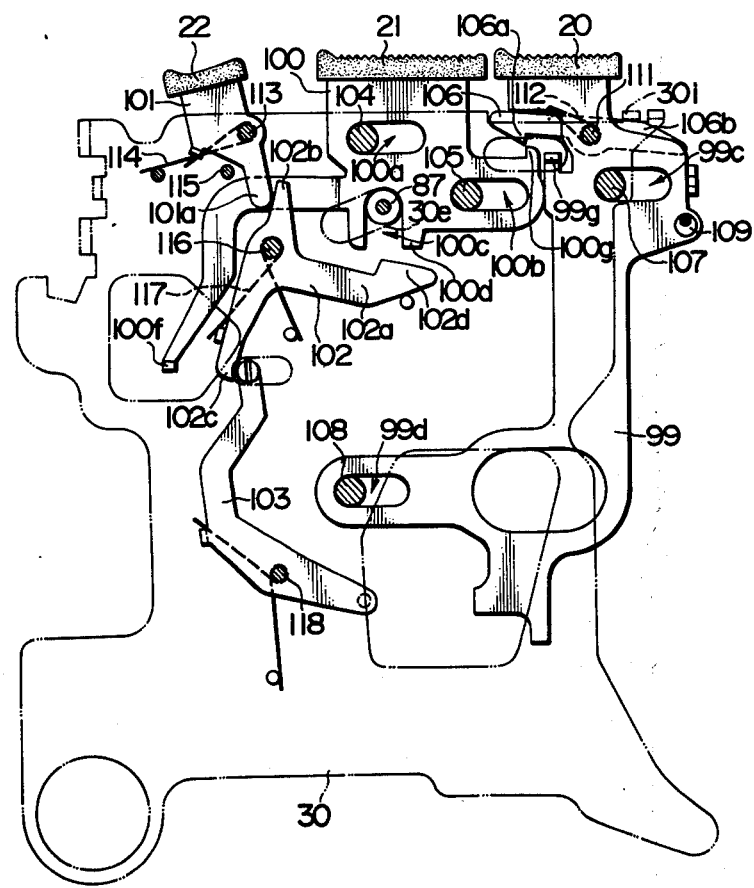
FIG. 10 is a view similar to FIG. 5 illustrating the operation of the various parts during a stop mode of the recorder.
Figure 11:
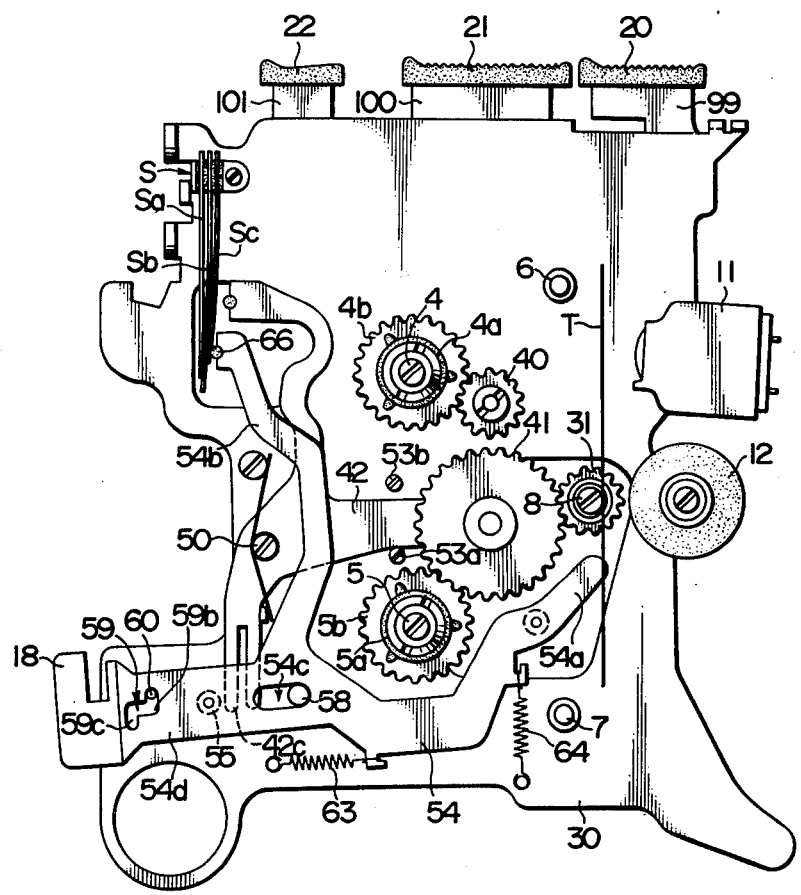
FIG. 11 is a view similar to FIG. 4, illustrating the operation of the various parts during a rapid tape advance mode of the recorder.

The tape recorder can be manually stopped during a playback or a record mode thereof by returning the playback and/or record member to their initial position. As shown in FIGS. 6, 7 or 8, 9, a playback mode or a record mode of the tape recorder can be manually interrupted by depressing the stop button 22 (see FIGS. 2 and 3B). As the button 22 is depressed, the stop member 101 rocks counter-clockwise about the pivot 113 against its own bias, as shown in FIG. 10, whereby its release arm 101a drives the second arm 102b of the locking member 102. Thereupon, the locking member 102 rotates clockwise about the pivot 116 against its own bias, releasing the engagement between the hook-shaped end 102d and the projection 100d of the playback member 100.

Upon such release, the head support plate 75 (see FIGS. 6 and 8) returns by rotating clockwise about the pivot 76 under its own bias. As it returns, the actuator pin 87 fixedly mounted thereon moves from left to right, as viewed in FIG. 10, within the opening 30e. This movement results a returning movement of the playback member 100 from left to right, as viewed in FIG. 10, since the actuator pin 87 is maintained in fitting engagement with the fork 100c of the playback member 100. The resulting movement of the playback member 100 also moves the record member 99 therewith, thus returning the latter.

When the members 99, 100 have returned to their initial position as shown in FIG. 10, the switch actuator 100f opens the main switch S, so that the motor 33 is deenergized and the operation of the tape recorder is stopped. When the head support plate 75 returns, the head 11 is moved away from the tape T as is the pinch roller 12 from the capstan 8, being returned to their respective initial positions. In the course of the returning movement of the record member 99 to its initial position, the arm 106b of the connecting member 106 bears against the depending piece 30i, whereby the connecting member 106 is caused to rock clockwise about the pivot 111 against its own bias, releasing the engagement between the hook-shaped end 106a and the hook 100g. Thus, the depression of the stop button 22 returns the various members from the positions which they assumed during a record or playback mode to their initial positions shown in FIGS. 4 and 5. The release of the stop button 22 allows the stop member 101 to be returned to its initial position shown in FIG. 5 under the resilience of the return spring 114.

(D) Rapid tape advance

A rapid tape advance is enabled by moving the tape rewind button 18 to the right, as viewed in FIG. 1, along the front operating panel 2d. As shown in FIG. 1, as the button 18 is moved to the right, the tape rewind member 54 is rocked counter-clockwise about the stud 58 against the tension of the springs 63, 64. The rocking motion takes place as far as is permitted by the short slot portion 59b formed in the rewind member 54. As a result of such rocking motion, the insulating member 66 on the end of the second arm 54b thereof brings all of the movable contacts Sa, Sb, Sc of the main switch S into engagement with each other, thus causing the motor 33 to rotate at a higher rate. The resulting drive is transmitted through the tape drive system which comprises the capstan 8, drive gear 31, drive switching gear 41, drive gear 5b to the tape take-up shaft 5, thus causing the tape take-up shaft 5 to rotate at the higher rate to take up the tape T from the tape supply shaft 4. In this manner, a rapid tape advance is achieved.

(E) Tape rewind

A tape rewind is enabled by depressing the tape rewind button 18 inward into the operating panel 2d shown in FIG. 1. The depression of the button 18 causes the rewind member 54 to move inwardly against its own bias under the guiding action provided by the cooperation between the slots 54c, 59 and the stud 58 and pin 60. The resulting movement causes the depending pin 55 secured thereto to drive the forked end 42c of the second arm 42b of the drive switching lever 42 in a manner to rotate the lever 42 counter-clockwise about the pivot 50 against its own bias. As the lever 42 rotates, the drive switching gear 41 mounted on the distal end of its first arm 42a revolves clockwise about the drive gear 31 while rotating itself, thus moving away from the drive gear 5b and moving into meshing engagement with the idle gear 40. Now, the tape supply shaft 4 functions as a tape rewind shaft while the tape take-up shaft 5 functions as a tape supply shaft.

When the lever 42 rotates, the insulating member 56 mounted on the distal end of its third arm 42d brings all of the movable contacts Sa, Sb, Sc of the main switch S into engagement with each other, causing the motor 33 to rotate at the higher rate. Thereupon, the drive is transmitted to the tape rewind shaft 4 to rotate it at the higher rate through the tape drive system which now comprises the capstan 8, drive gear 31, drive switching gear 41, idle gear 40, drive gear 4b and tape rewind shaft (or tape supply shaft) 4. Since the idle gear 40 is interposed in the drive system, the direction of rotation is reversed from the direction in which it rotated during the tape transport in the forward direction. Thus, a tape rewind at a higher rate is achieved.

Figure 12:
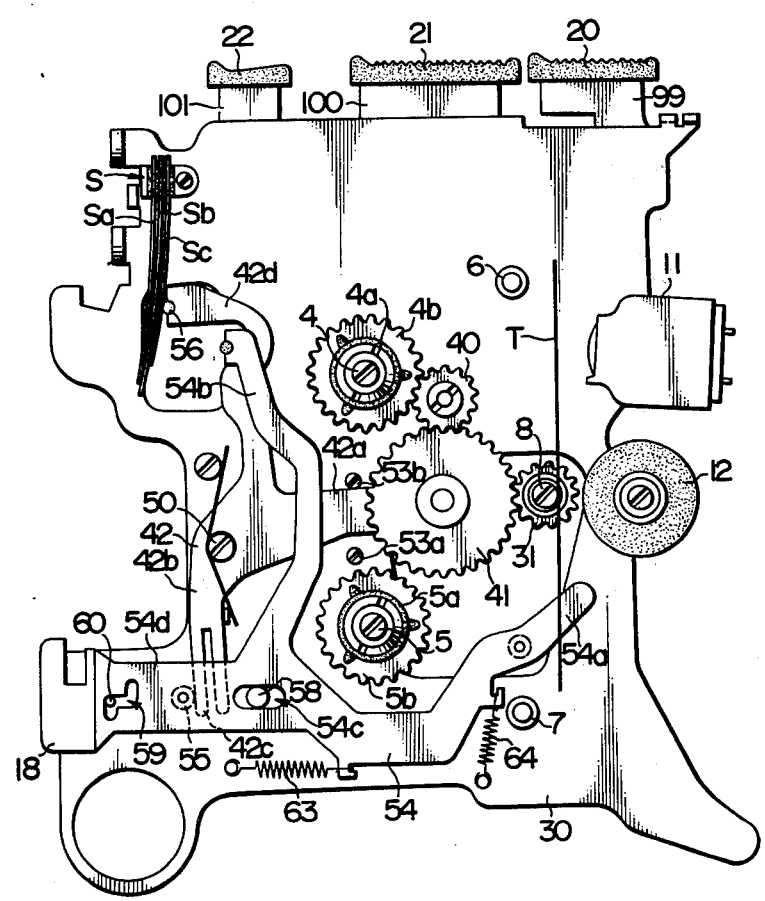
FIG. 12 is a view similar to FIG. 4, illustrating the operation of the various parts during a tape rewind mode of the recorder.
Figure 13:
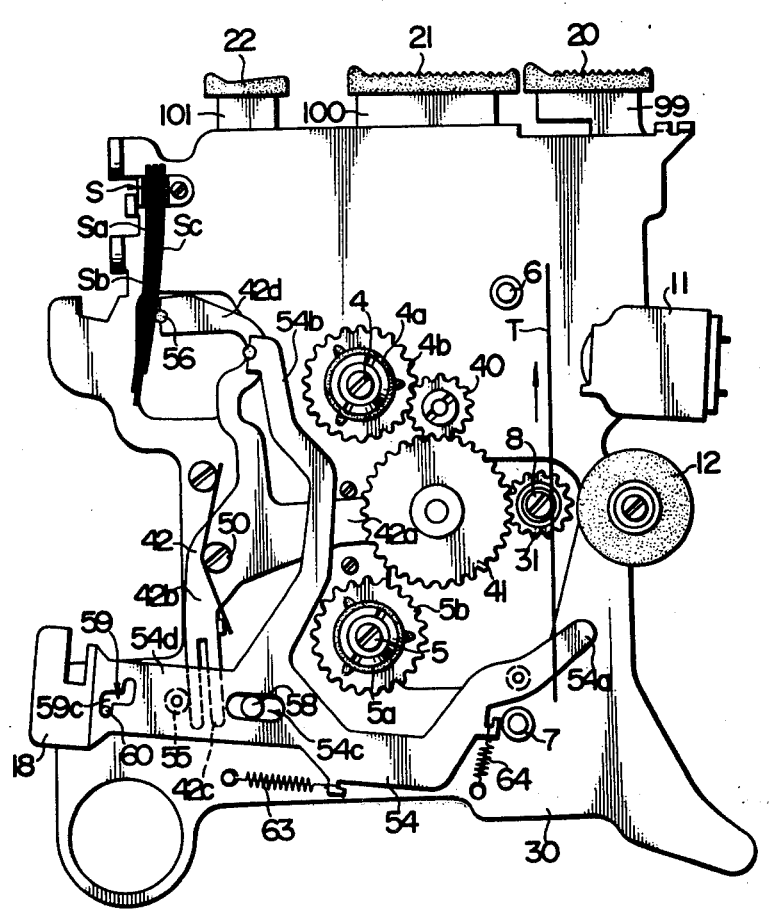
FIG. 13 is a view similar to FIG. 12, illustrating a tape rewind member locked in its operative position.
Figure 14:
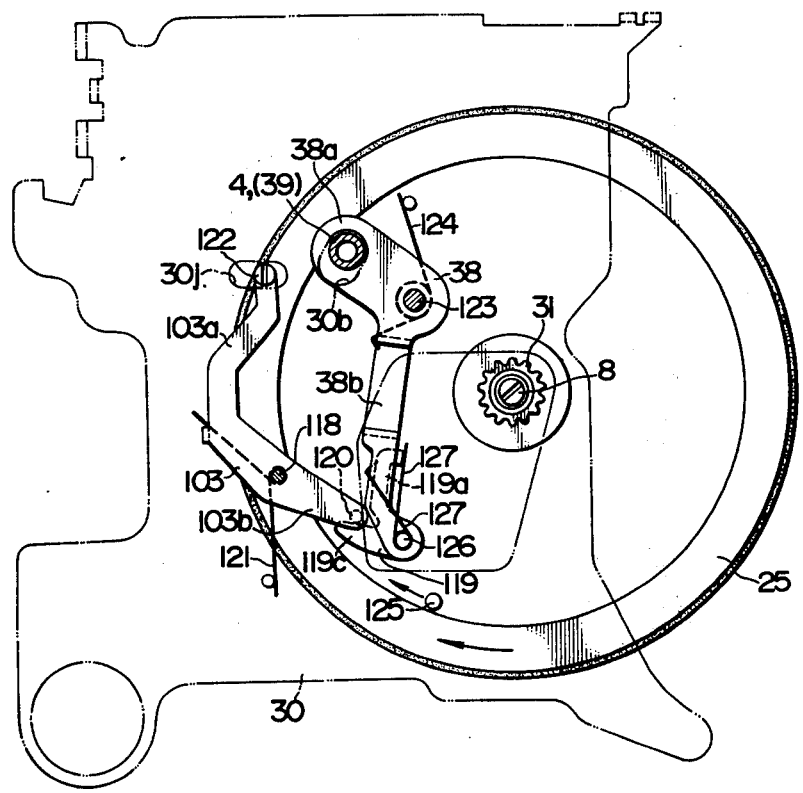
FIGS. 14, 15 and 16 are fragmentary views corresponding to FIGS. 4 and 5, illustrating the operation of an auto shut-off apparatus according to the invention.

During a tape rewind mode, the tape rewind button 18 and the rewind member 54 can be locked in their operative positions. This is achieved by depressing the tape rewind button 18 to cause an inward movement of the tape rewind member 54 and subsequently moving the button 18 to the left, as viewed in FIG. 1, along the panel 2d, as illustrated in FIG. 12. The movement of the button 18 to the left causes the tape rewind member 54 to rock, from its operative position shown in FIG. 12, further clockwise about the stud 58 under the resilience of the spring 64 as shown in FIG. 13. Such rocking motion takes place as far as is permitted by the movement of the pin 60 within the short slot portion 59c formed in the rewind member 54 until it bears against one edge of the slot portion. When the pin 60 is recessed into the slot portion 59c, the button 18 and the rewind member 54 are locked in the operative position shown in FIG. 13 under the resilience of the springs 63, 64 if the button 18 is released. Thus, a tape rewind continues under this condition.

(F) Auto shut-off

The purpose of an auto shut-off operation is to provide an automatic detection of a tape end being reached during a tape rewind mode of the tape recorder in order to stop the operation of the tape recorder automatically and to reset any member which assumes its operative position to its intial position.

During a tape rewind mode of the tape recorder, a tape continues to be rewound when the tape rewind member 54 is locked in its operative position as shown in FIG. 13 and the tape rewind button 18 is maintained depressed. When a tape end is reached during a rewind mode, the hub 1b (see FIG. 1) to which the tape end is secured ceases to rotate, whereupon the tape supply shaft (or normal tape take-up shaft) 5 also ceases to rotate. However, since a drive force is transmitted from the drive switching gear 41 to the tape rewind shaft 4 through the idle gear 40, the drive gear 4b on the rewind shaft revolves clockwise about the idle gear 40 while rotating itself. As a result of such revolution of the drive gear 4b, the tape rewind shaft 4 which is fitted into the tape hub 1b moves from left to right within the opening 30b formed in the baseplate 30, as shown in FIG. 4. This movement results in a rocking motion of the tape end detecting lever 38 clockwise about the pivot 123 against its own bias, accompanying a movement of the abutment lever 119 which is pivotally mounted at 126 on the distal end of the arm 38b, thus bringing the arm 119c into the path of rotation of the pin 125 fixedly mounted on the flywheel 25.

Figure 15:
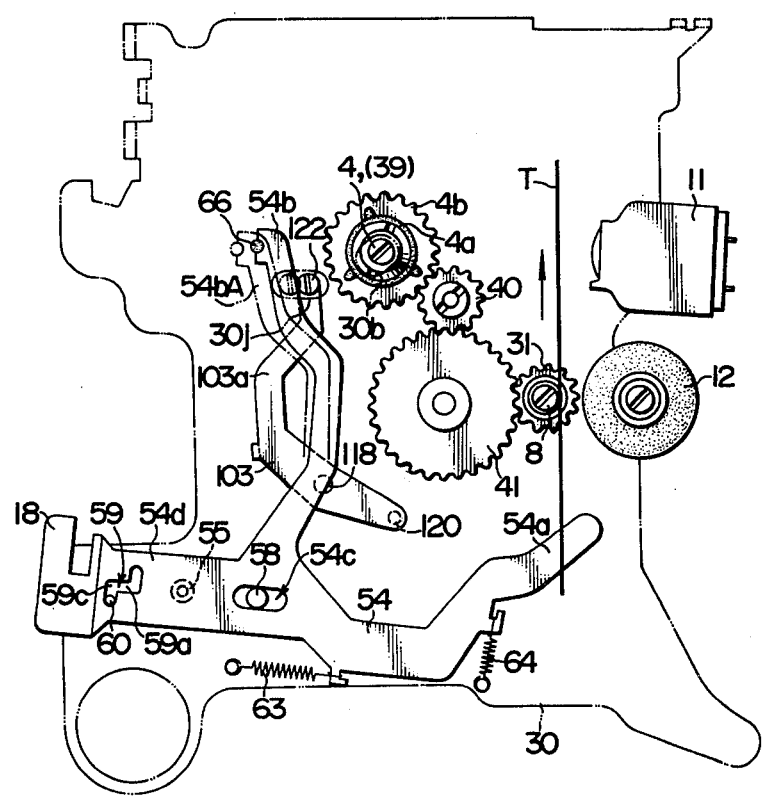

When the flywheel 25 rotates through an angle, which is at most one revolution and which is normally less than one revolution, the pin 125 abuts against the arm 119c to drive it, whereby the abutment lever 119 rocks clockwise about the pivot 126 against its own bias. This in turn causes the arm 119c to bear against the depending pin 120 from the release lever 103, driving it for counter-clockwise rotation about the pivot 118. This in turn causes the crescent pin 122 on the end of the arm 103a to move to the left, as viewed in FIG. 15, within the elongated slot 30j formed in the baseplate 30. Since the second arm 54b of the tape rewind member 54 is moved to a position 54bA shown in phantom line, the tape rewind member 54 is caused to rock counter-clockwise about the stud 58 against its own bias, whereby the pin 60 located in the short slot portion 59c will be moved to lie in the long slot portion 59a. Then, the resilience of the spring 63 returns the tape rewind member 54 to its initial position under the guiding action of the slots 59a, 54c. When the rewind member returns, the drive switching lever 42 (see FIG. 13) which maintained the main switch S closed by the drive from the pin 55 returns by rotating clockwise about the pin 50 under its own bias, thus opening the main switch S to stop the tape rewind automatically. Thus, an auto shut-off operation is achieved when a tape end is reached even during a tape rewind mode, thus automatically stopping the tape recorder.

The pin 125 expels the arm 119c of the abutment lever 119 to cause the latter to rock clockwise about the pivot 126, causing an automatic stop operation to be performed by the tape recorder. Subsequently, when the pin 125 moves away from the arm 119c, the abutment lever 119 returns to its initial position under its own bias. Hence, the locking lever 102 and the release lever 103 also return to their initial positions under the influence of their own bias springs.

Figure 16:
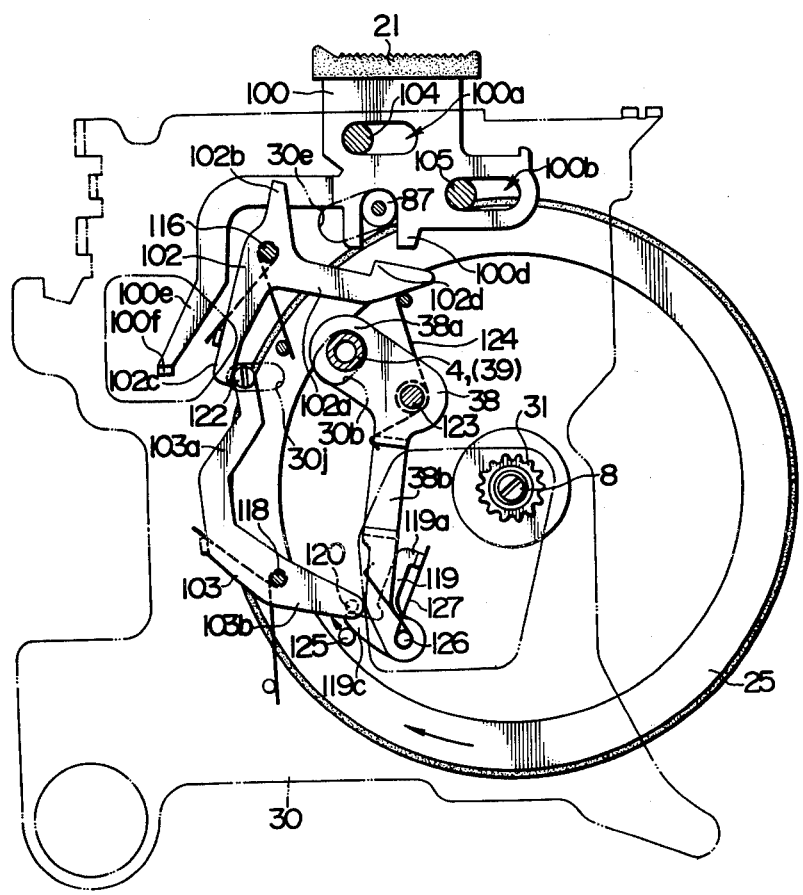

When a tape end is reached during a record or playback mode, the hub 1b to which the tape end is secured will be pulled by the tape tension in the direction along which the tape extends. As a result of such pulling action, the tape supply shaft (tape rewind shaft) 4 which fits into the hub 1b will move from left to right within the opening 30b formed in the baseplate 30, as shown in FIG. 16. Such movement causes the arm 119c of the abutment lever 119 to be brought into the path of rotation of the pin 125 as mentioned previously, whereby the release lever 103 is driven by the pin 125 to rock counter-clockwise about the pivot 118. Thus, the end of its arm 103a bears against and drives the third arm 102c of the locking member 102, thereby rotating the locking lever 102 clockwise about the pivot 116 against its bias. This rotation of the locking lever results in releasing the engagement between the hook-shaped end 102d thereof and the projection 100d of the playback member 100, thus returning the playback member 100 to its initial position through an operation which occurs during a stop mode described in connection with FIG. 10. The record or playback mode is released from the locked condition, and the tape recorder is automatically stopped.

What is claimed is:

1. A cassette tape recorder having an auto shut-off apparatus which is operable during a tape rewind mode; the apparatus comprising a tape end detecting lever pivotally mounted on a stationary baseplate within a tape recorder and having an arm which carries a tape rewind shaft adapted to engage one of the tape hubs of

UNITED STATES PATENT AND TRADEMARK OFFICE
CERTIFICATE OF CORRECTION

PATENT NO. : 4,139,167
DATED : February 13, 1979
INVENTOR(S) : Akira Osanai

It is certified that error appears in the above-identified patent and that said Letters Patent are hereby corrected as shown below:

Page 1, at Item "[21]", "Appl. No. 795,065" should read --Appl. No. 794,065--

Column 10, Line 6 after the word "located" insert --opposite--

Column 13, Line 9 before the word "are" insert --receive and--

Column 13, Line 55 the word "porton" should read --portion--

Column 14, Line 39 the word "another" should read --other--

Column 20, Line 8 the word "for" should read --into--

Signed and Sealed this

Twelfth Day of June 1979

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,139,167
DATED : February 13, 1979
INVENTOR(S) : Akira Osanai

It is certified that error appears in the above-identified patent and that said Letters Patent are hereby corrected as shown below:

Page 1, at Item "[21]", "Appl. No. 795,065" should read --Appl. No. 794,065--

Column 10, Line 6 after the word "located" insert --opposite--

Column 13, Line 9 before the word "are" insert --receive and--

Column 13, Line 55 the word "porton" should read --portion--

Column 14, Line 39 the word "another" should read --other--

Column 20, Line 8 the word "for" should read --into--

Signed and Sealed this

Twelfth Day of June 1979

[SEAL]

Attest:

RUTH C. MASON
Attesting Officer

DONALD W. BANNER
Commissioner of Patents and Trademarks